(12) United States Patent
Tsujimoto (10) Patent No.: US 7,369,881 B2
(45) Date of Patent: May 6, 2008

(54) PORTABLE TELEPHONE AND METHOD OF MANUFACTURING THE SAME

(75) Inventor: Masakazu Tsujimoto, Tokyo (JP)

(73) Assignee: NEC Corporation, Tokyo (JP)

( * ) Notice: Subject to any disclaimer, the term of this patent is extended or adjusted under 35 U.S.C. 154(b) by 653 days.

(21) Appl. No.: 11/058,248

(22) Filed: Feb. 16, 2005

(65) Prior Publication Data

US 2005/0181843 A1    Aug. 18, 2005

(30) Foreign Application Priority Data

Feb. 18, 2004    (JP) .............................. 2004-040951

(51) Int. Cl.
*H04M 1/00*    (2006.01)
(52) U.S. Cl. .................. 455/575.1; 361/736; 361/752; 361/814
(58) Field of Classification Search ............. 455/575.1, 455/347
See application file for complete search history.

(56) References Cited

U.S. PATENT DOCUMENTS

| | | | |
|---|---|---|---|
| 5,416,541 A * | 5/1995 | Fog ............................ | 353/119 |
| 5,573,107 A * | 11/1996 | Nakano et al. ............. | 200/314 |
| 5,940,015 A * | 8/1999 | Thornton et al. ............ | 341/20 |
| 6,166,337 A * | 12/2000 | Flegeo ........................ | 200/5 A |
| 6,286,972 B1 * | 9/2001 | Shepherd et al. ............ | 362/86 |
| 6,576,856 B2 * | 6/2003 | Masaru et al. ............... | 200/512 |
| 6,648,530 B2 * | 11/2003 | Kamei et al. ................ | 400/472 |
| 6,660,200 B2 * | 12/2003 | Nakajo ........................ | 264/154 |
| 6,806,815 B1 * | 10/2004 | Kaikuranta et al. ........... | 341/22 |
| 6,874,926 B2 * | 4/2005 | Nousiainen ................. | 362/559 |
| 6,912,410 B2 * | 6/2005 | Auten et al. ................. | 455/572 |
| 6,940,030 B2 * | 9/2005 | Takeda et al. .............. | 200/343 |
| 7,014,377 B2 * | 3/2006 | Yamauchi .................... | 400/472 |
| 7,034,235 B2 * | 4/2006 | Hosaka ........................ | 200/314 |
| 7,053,799 B2 * | 5/2006 | Yu et al. ........................ | 341/31 |
| 7,181,007 B2 * | 2/2007 | Gremo et al. .......... | 379/433.07 |
| 7,250,937 B2 * | 7/2007 | Takagi ........................ | 345/168 |
| 7,294,803 B2 * | 11/2007 | Lee et al. .................... | 200/314 |
| 2001/0023818 A1 * | 9/2001 | Masaru et al. .............. | 200/512 |
| 2002/0003482 A1 * | 1/2002 | Bestle .......................... | 341/22 |

(Continued)

FOREIGN PATENT DOCUMENTS

EP    1513164 A2 *    3/2005

(Continued)

*Primary Examiner*—Matthew Anderson
*Assistant Examiner*—Hai V Nguyen
(74) *Attorney, Agent, or Firm*—Young & Thompson (57) ABSTRACT

A portable telephone includes a lower case and elastic sheet, an operation button portion component, and an operation button illuminating light source. Predetermined openings are formed in each of the lower case and elastic sheet to arrange a plurality of front surface operation buttons and plurality of side surface operation buttons such that the openings are in one-to-one correspondence with the operation buttons. The operation button portion component is arranged by bending along inner sides of front and side surfaces of the lower case and elastic sheet. The operation button portion component is obtained by fixing the respective operation buttons on an elastic sheet with a predetermined design. The operation button illuminating light source is arranged on a circuit board frame to be incorporated in the portable telephone and illuminates the front surface and side surface operation buttons. A method of manufacturing the portable telephone is also disclosed.

6 Claims, 6 Drawing Sheets

| U.S. PATENT DOCUMENTS | | | | | FOREIGN PATENT DOCUMENTS | | |
|---|---|---|---|---|---|---|---|
| 2003/0137079 A1* | 7/2003 | Nakajo | 264/259 | GB | 2 337 857 | | 12/1999 |
| 2003/0211874 A1* | 11/2003 | Mizuta et al. | 455/575.4 | JP | 10-164196 | | 6/1998 |
| 2004/0022573 A1* | 2/2004 | Yamauchi | 400/489 | JP | 10164196 A | * | 6/1998 |
| 2004/0240162 A1* | 12/2004 | Hsu et al. | 361/680 | WO | WO 98/47123 | | 10/1998 |
| 2005/0227738 A1* | 10/2005 | Ono | 455/566 | WO | WO 00/31949 | | 6/2000 |
| 2006/0038788 A1* | 2/2006 | Tai | 345/168 | | | | |
| 2007/0199811 A1* | 8/2007 | Hotta et al. | 200/310 | * cited by examiner | | | |

PORTABLE TELEPHONE AND METHOD OF MANUFACTURING THE SAME

BACKGROUND OF THE INVENTION

The present invention relates to a portable telephone having operation buttons on front and side surfaces of its housing, and a method of manufacturing the same.

Conventionally, the function of the portable telephone has progressed. A portable telephone of a type that has front surface operation buttons and side surface operation buttons as operation buttons (keys) serving as a means for the input operation of the user has been developed. Various types of operation buttons (keys), e.g., a dial button, function button, and direction input button, are arranged on the front surface (side surface) of the housing of the portable telephone. Operation buttons (keys) which realize input of predetermined functions are arranged on the side surface of the housing.

In a highly functional portable telephone having operation buttons on both the front and side surfaces of the housing in this manner, usually, a front surface operation button portion and side surface operation button portion are fabricated as two separate components to form the front surface operation buttons and side surface operation buttons. The two components are attached to the housing case to complete a portable telephone product.

Japanese Patent Laid-Open No. 10-164196 discloses a technique for providing operation buttons to the side surface of the housing of a portable telephone. According to this technique, rubber is provided to the side surface of the housing of the portable telephone to impart waterproof and non-slip functions to the side surface of the housing of the portable telephone, and operation buttons are arranged on the rubber portion.

In the conventional portable telephone, however, a component that forms the side surface operation button portion is assembled by fitting it in a space defined by the inner wall of the housing case of the portable telephone, a side surface operation button component support wall arranged inside the case, and the like. The side surface operation button component support wall as a part of the housing case is located between the side surface operation buttons and a circuit board frame. Therefore, light from an operation button illuminating light source arranged on the circuit board frame is blocked by the side surface operation button component support wall and does not reach the side surface operation buttons. Also, the side surface operation buttons do not have an illuminating function.

SUMMARY OF THE INVENTION

It is, therefore, the principal object of the present invention to provide a portable telephone that can illuminate not only the front surface operation buttons but also side surface operation buttons of a portable telephone, and a method of manufacturing the same.

In order to achieve the above object, according to the present invention, there is provided a portable telephone comprising a housing case in which predetermined openings are formed at a plurality of portions to arrange a plurality of front surface operation buttons and plurality of side surface operation buttons of the portable telephone such that the openings are in one-to-one correspondence with the operation buttons, an operation button portion component which is arranged by bending along inner sides of front and side surfaces of the housing case and obtained by fixing the operation buttons on an elastic sheet with a predetermined design, and an operation button illuminating light source which is arranged on a circuit board frame to be incorporated in the portable telephone and illuminates the plurality of front surface operation buttons and side surface operation buttons.

In order to achieve the above object, according to the present invention, there is also provided a portable telephone manufacturing method comprising the steps of forming, in a housing case of a portable telephone, predetermined openings at a plurality of portions to arrange a plurality of front surface operation buttons and plurality of side surface operation buttons such that the openings are in one-to-one correspondence with the operation buttons, arranging an operation button portion component, obtained by fixing the operation buttons on an elastic sheet with a predetermined design, by bending along inner sides of front and side surfaces of the housing case, arranging an operation button illuminating light source, which illuminates the plurality of front surface operation buttons and side surface operation buttons, on a circuit board frame to be incorporated in the portable telephone, and building the circuit board frame provided with the operation button illuminating light source into the housing case in which the operation button component is arranged.

DESCRIPTION OF THE PREFERRED EMBODIMENT

As shown in FIGS. 1 to 7, according to the present invention, predetermined openings are formed at a plurality of portions in a housing case for a portable telephone to arrange a plurality of front surface operation buttons and plurality of side surface operation buttons such that the openings are in one-to-one correspondence with the operation buttons. An operation button portion component obtained by fixing the operation buttons on an elastic sheet with a predetermined design is arranged by bending it along the inner sides of the front and side surfaces of the housing case. A circuit board frame provided with an operation button illuminating light source which illuminates the plurality of front surface operation buttons and side surface operation buttons is combined with the operation button portion component to form the portable telephone.

The embodiment of the present invention will be described with reference to the accompanying drawings through comparison with a conventional portable telephone.

Figure 1:
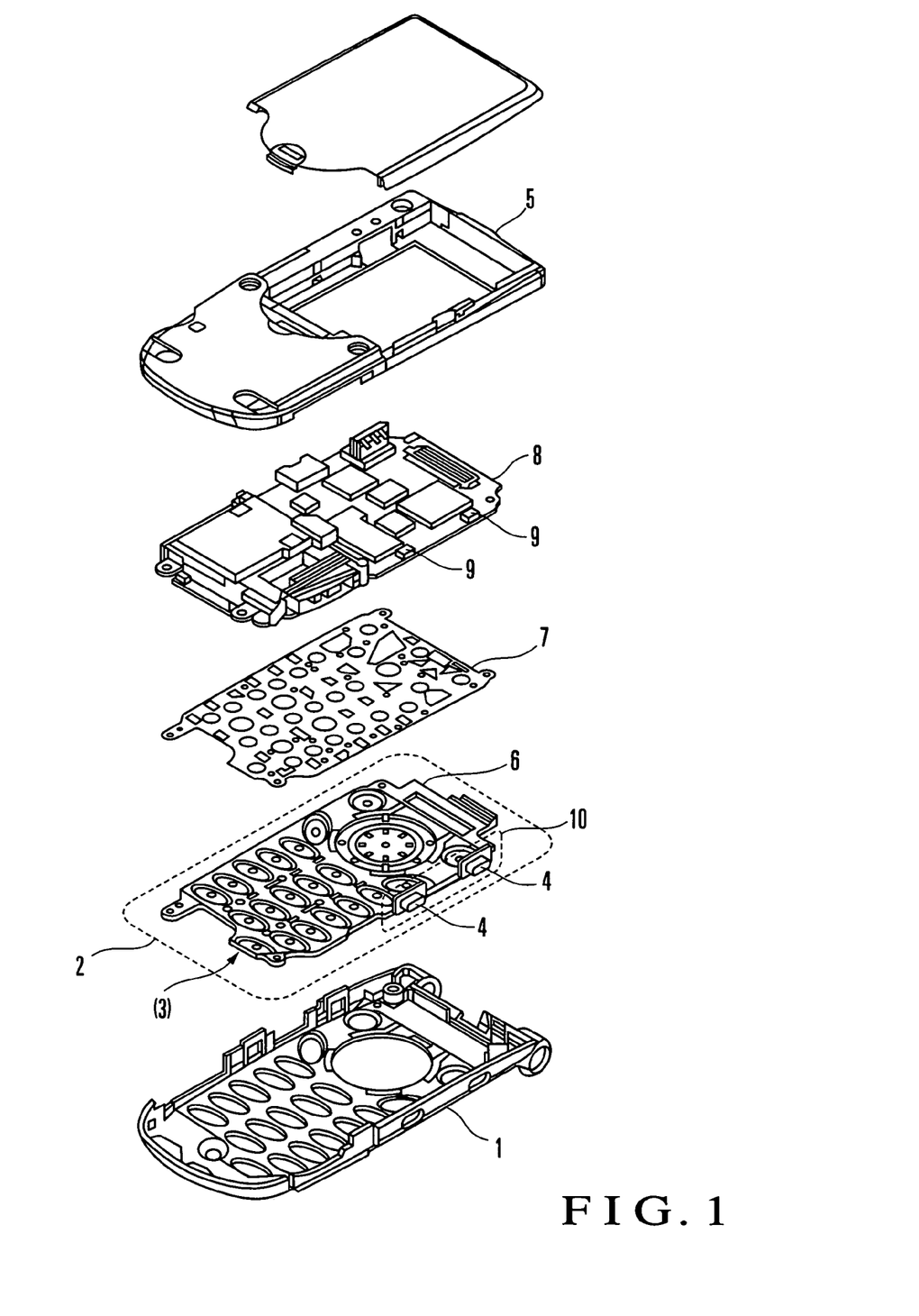
FIG. 1 is an exploded perspective view showing the structure of a portable telephone according to an embodiment of the present invention.

First, the structure of a portable telephone according to this embodiment will be described with reference to FIG. 1. In the following description, particularly, of a foldable portable telephone (in which upper and lower housings are rotatably connected to each other through a hinge), the structure of the lower housing which is provided with an operation button portion will be described. In FIG. 1, the portable telephone is exploded. The upper side of FIG. 1 corresponds to the rear surface (lower surface) of a portable telephone housing, and its lower side corresponds to the front surface (upper surface, front surface, or operation input portion surface) of the portable telephone housing.

Figure 2:
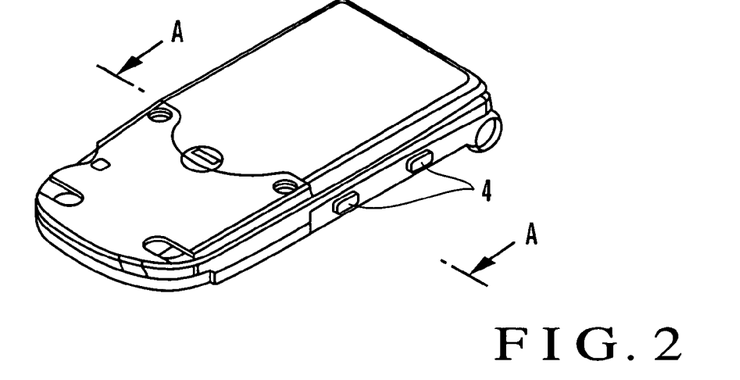
FIG. 2 is a view showing the appearance of the portable telephone according to the embodiment shown in FIG. 1 of the present invention.

FIG. 2 shows the appearance (particularly an appearance seen from the rear side) of the portable telephone formed by assembling the respective components of FIG. 1. As shown in FIG. 2, in the portable telephone of this embodiment, operation buttons (side surface operation buttons 4) are arranged on the side surface of the housing. This embodiment will be exemplified by an example in which two operation buttons are arranged on one side surface of the portable telephone housing.

As shown in FIG. 1, roughly speaking, the portable telephone of this embodiment has an upper case 1, an operation button portion component 2 (front surface operation buttons 3, the side surface operation buttons 4, and an elastic sheet 6), a switch circuit 7, a circuit board frame 8 (board mounting type switches 9 for the side surface operation buttons and an operation button illuminating light source 13 (not shown)), and a lower case 5. These components are assembled in the manufacture of the product. The operation button portion component 2 is a single component formed by fixing the plurality of front surface operation buttons 3 and side surface operation buttons 4 to the elastic sheet 6 with a predetermined design.

According to one characteristic feature of the present invention, in a structure including the front surface operation buttons 3 and side surface operation buttons 4, a front surface operation button portion and side surface operation button portion, which are formed of separate components in a conventional portable telephone (to be described later), are integrated into one component. The elastic sheet 6 which forms the operation button portion is designed and formed by extending a region to arrange a side surface operation button portion 10 to be longer than in the prior art, and is fixed and arranged at a predetermined position. In FIG. 1, the operation button portion component 2 indicated by a broken line frame is integrally formed to include the side surface operation button portion 10.

In an operation button attaching step during the manufacture of the product, the operation button portion component 2 (elastic sheet 6) is arranged on the inner side surface of the upper case 1 having front and side surfaces by bending to conform to the shape of the inner side surface. FIG. 1 shows a state wherein the side surface operation button portion 10 is bent at about 90° with respect to the front surface portion. The side surface operation buttons 4 are arranged such that they are exposed to and accommodated in openings in the side surface of a housing which is formed of the upper case 1 and lower case 5 by bending the side surface operation button portion 10 of the elastic sheet 6.

With the portable telephone according to this embodiment and a method of manufacturing the same, the operation button portion which conventionally includes two separate components is integrally formed into one component, as described above. Thus, the effect of decreasing the number of steps of attaching the operation buttons and decreasing the component cost can be obtained.

The operation button portion component 2 shown in FIG. 1 is a component obtained by arranging and fixing the plurality of front surface operation buttons 3 and side surface operation buttons 4 to the elastic sheet 6, serving as a support made of an elastic material, with the predetermined design. The elastic sheet 6 is made of light-transmitting silicone rubber or the like. As shown in FIG. 1, the elastic sheet 6 is arranged between the upper case 1 and switch circuit 7. The elastic sheet 6 is arranged such that the front surface operation buttons 3 serving as operation buttons (keys) to be formed on the operation button portion component 2, openings (through holes) in the upper case 1, domes formed on the switch circuit 7, contacts on the circuit board frame 8, and the like correspond to each other. Also, the elastic sheet 6 is arranged such that the side surface operation buttons 4 serving as operation buttons (keys) to be formed on the operation button portion component 2, openings (through holes) in the upper case 1, the board mounting type switches 9 mounted on the circuit board frame 8, and the like correspond to each other.

As shown in FIG. 1, the switch circuit 7 is a component on which flexible dome-shaped portions corresponding to the respective front surface operation buttons 3 are formed to form a predetermined circuit. The circuit board frame 8 is a board on which various types of devices and circuits such as a processor and memory are formed, and supports the switch circuit 7, operation button portion component 2, and the like in the housing.

Openings to arrange and accommodate the side surface operation buttons 4 on the side surface of the housing are designed and formed in one side surface portion of each of the upper case 1 and lower case 5 that form the entire housing case.

Figure 3:
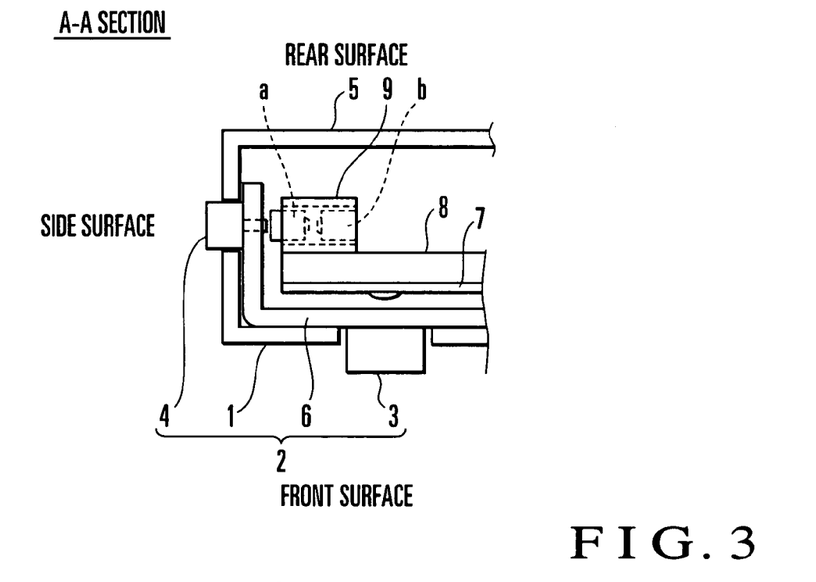
FIG. 3 is a sectional view (A-A section) showing the position of an operation button portion component 2 in the portable telephone according to the embodiment shown in FIG. 1 of the present invention.

FIG. 3 schematically shows a section taken along the line A-A of the housing of the portable telephone of the embodiment shown in FIG. 2. The operation button portion component 2 including the front surface operation buttons 3, side surface operation buttons 4, and the elastic sheet 6 which fixes the respective operation buttons at predetermined positions is arranged on the inner side surface of the upper case 1.

The front surface operation buttons 3 are exposed through through holes formed in the upper case 1. When the elastic sheet 6 is bent along the inner side surface of the upper case 1, the side surface operation buttons 4 are exposed to and arranged in the openings formed in the side surface of the upper case 1.

The switch circuit 7 and the circuit board frame 8 which supports the switch circuit 7 from inside are arranged inside the elastic sheet 6. The switch circuit 7 opposes the front surface operation buttons 3 and side surface operation buttons 4. The board mounting type switches 9 are formed on the circuit board frame 8 to correspond to the side surface operation buttons 4.

Figure 7:
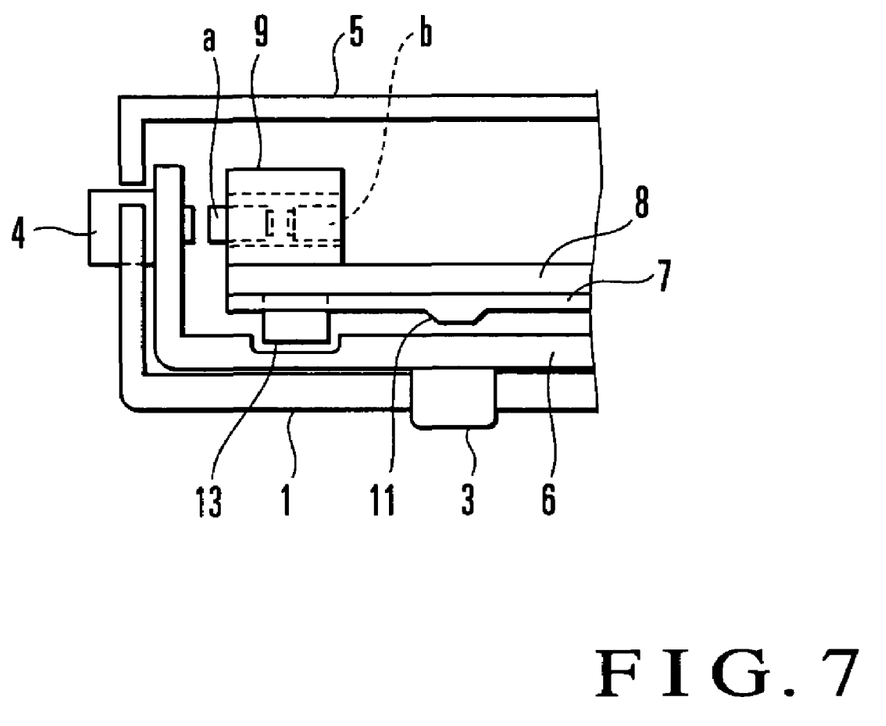
FIG. 7 is a schematic sectional view taken along the line A-A of the housing of the portable telephone according to the embodiment shown in FIG. 2 of the present invention.

FIG. 7 schematically shows a section taken along the line A-A of the housing of the portable telephone of the embodiment shown in FIG. 2. As shown in FIG. 7, when the user presses a front surface operation button 3, the elastic sheet 6 and a dome portion 11 corresponding to the pressed button 3 flex and are connected to or disconnected from a contact portion on the circuit board frame 8 to electrically turn on/off the switch. When the user presses a side surface operation button 4, the elastic sheet 6 flexes, and one contact portion a of the board mounting type switch 9 corresponding to the pressed button 4 and formed on the circuit board frame 8 comes into contact with or separates from the other contact portion b of the board mounting type switch 9 to electrically turn/off the switch.

The switching scheme using a flexible dome shown in this embodiment, and the board mounting type switch shown in an example of the conventional portable telephone (to be described later in detail) are a known technique. Various types of switching schemes are available. Other than the scheme of this embodiment which uses the operation button using the dome or the board mounting type switch, operation buttons of various types of schemes can be mixedly provided to the front and side surfaces, respectively, of the housing.

Figure 4:
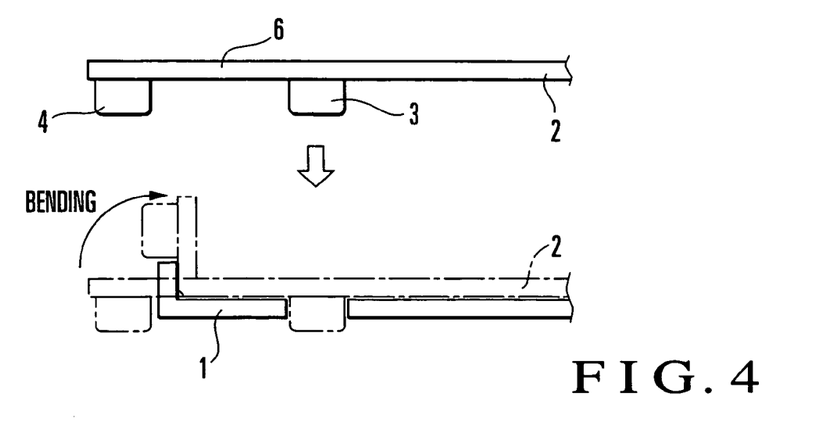
FIG. 4 is a sectional view showing how an elastic sheet 6 is bent in the portable telephone according to the embodiment shown in FIG. 1 of the present invention.

FIG. 4 shows how the elastic sheet 6 of the operation button portion component 2 is bent along the inner side surface of the upper case 1 when attaching the operation button portion component 2 to the upper case 1. In the assembling step of a portable telephone product, when the operation button portion component 2 is pressed onto the inner side surface of the upper case 1, the elastic sheet 6 of the operation button portion component 2 is bent to conform to the shape of the upper case 1. By utilizing these characteristics, the side surface operation buttons 4 are accommodated in the openings at predetermined positions which are designed in advance (the shape of the region of the side surface operation button portion on the elastic sheet 6, the positions of the openings in the upper case 1, and the like are designed in advance).

Figure 8:
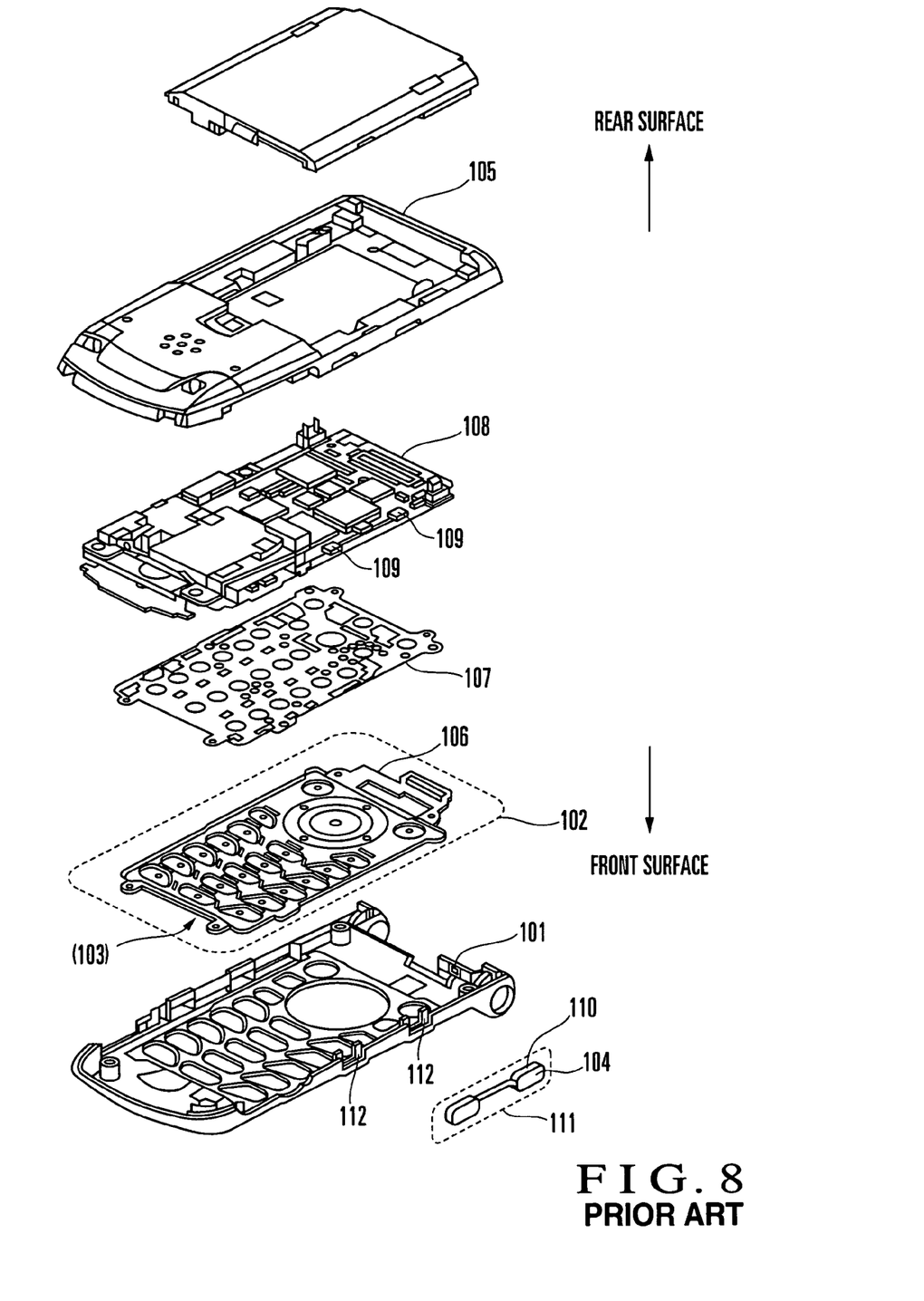
FIG. 8 is an exploded perspective view showing the structure of a conventional portable telephone.
Figure 9:
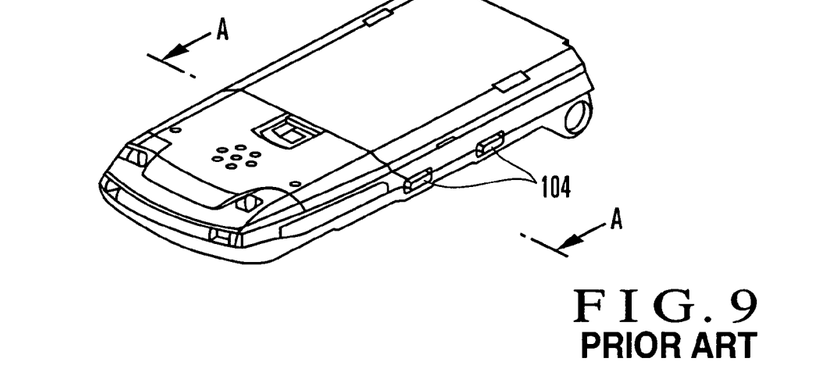
FIG. 9 is a view showing the appearance of the conventional portable telephone.

The structure of the conventional portable telephone including a front surface operation button portion and side surface operation button portion will be described with reference to FIG. 8. FIG. 8 explains the structure of the conventional portable telephone having the front surface operation button portion and side surface operation button portion. Roughly speaking, the conventional portable telephone has an upper case 101, front surface operation button portion component 102 (front surface operation buttons 103 and elastic sheet 106), side surface operation button portion component 111 (side surface operation buttons 104 and side surface operation button supports 110), switch circuit 107, circuit board frame 108 (board mounting type switches 109 for the side surface operation buttons, and operation button illuminating light source 113 (not shown)), and lower case 105. These components are assembled to form a portable telephone housing with the side surface operation buttons 104 on its side surface, as shown in FIG. 9. FIG. 9 shows an example in which two side surface operation buttons 104 are formed on one side surface of the housing.

The upper case 101 is a housing front surface side case component, and forms the entire housing case as it is joined with the lower case 105 serving as a housing rear surface side case component. The upper case 101 has openings corresponding to the front surface operation buttons 103 which are to be disposed on the basis of a predetermined design.

The front surface operation button portion component 102 is a component obtained by fixing the plurality of front surface operation buttons 103 to the elastic sheet 106 serving as a support. The front surface operation buttons 103 are fixed to that side (front surface side) of the elastic sheet 106 in FIG. 8 which is not shown.

The side surface operation button portion component 111 is a component obtained by fixing the side surface operation buttons 104 to the side surface operation button supports 110 serving as a support. FIG. 8 shows a case in which two side surface operation buttons 104 are to be formed.

Openings corresponding to the shapes of the side surface operation buttons 104 are formed in one side surface portion (the left side surface portion with respect to the front surface in this example) of each of the upper case 101 and lower case 105, so that the side surface operation buttons 104 of the side surface operation button portion component 111 can be arranged on the side surface of the housing when the two case components are joined together.

In this manner, in the conventional portable telephone described above, two different components, i.e., the front surface operation button portion component 102 and side surface operation button portion component 111, are used as the components that form the operation button portion.

The elastic sheet 106 is a component that serves as a support to fix the plurality of front surface operation buttons 103, and made of an elastic material such as light-transmitting silicone rubber. The elastic sheet 106 is arranged between the upper case 101 and switch circuit 107. The switch circuit 107 has flexible dome-shaped portions to correspond to the plurality of front surface operation buttons 103 to be disposed. The circuit board frame 108 has contact portions corresponding to the plurality of front surface operation buttons 103 to be disposed. The circuit board frame 108 has the board mounting type switches 109 for the side surface operation buttons 104.

In the assembling step of a portable telephone housing, the respective components are accommodated between the upper case 101 and lower case 105 in the order shown in FIG. 8. For the respective front surface operation buttons 103 to be disposed, the openings in the upper case 101, the front surface operation buttons 103 on the front surface operation button portion component 102, the dome portions on the switch circuit 107, and the contact points on the circuit board frame 108 correspond to each other. For the respective side surface operation buttons 104 to be disposed, the openings in the upper case 101, the operation buttons 104 on the side surface operation button portion component 111, and the board mounting type switches 109 on the circuit board frame 108 correspond to each other.

How the switch is turned on/off when an operation button is pressed will be roughly described. Regarding a given front surface operation button 103, when the user presses this, a force is applied to a corresponding dome portion 114 of the switch circuit 107 shown in FIG. 8 to flex the dome. The upper surface of the dome portion then comes into contact with a corresponding contact portion of the circuit board frame 108 to be electrically connected to it. Accordingly, the switch is turned on/off.

Figure 10:
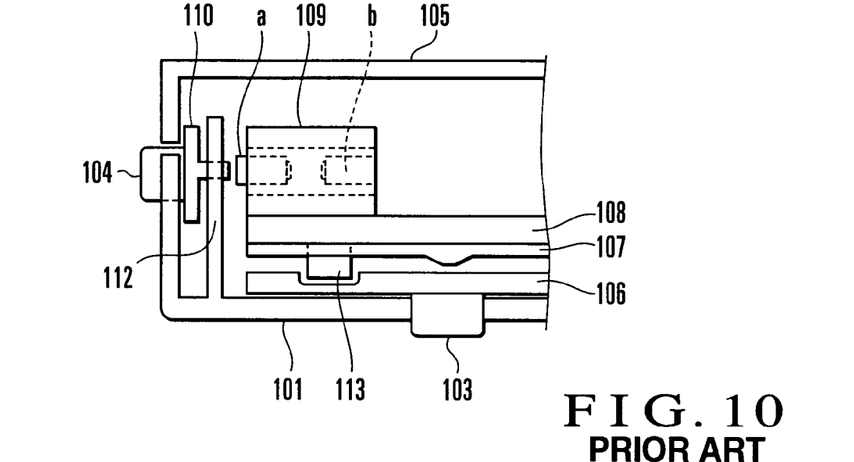
FIG. 10 is a schematic sectional view taken along the line A-A of the housing of the conventional portable telephone shown in FIG. 9.

As shown in FIG. 10, regarding a given side surface operation button 104, when the user presses this, a corresponding side surface operation button support 110 moves inside the housing case. One contact portion a of a corresponding board mounting type switch 109 formed on the circuit board frame 108 moves to come into contact with the other contact portion b of the board mounting type switch 109 to turn it on/off.

Figure 11:
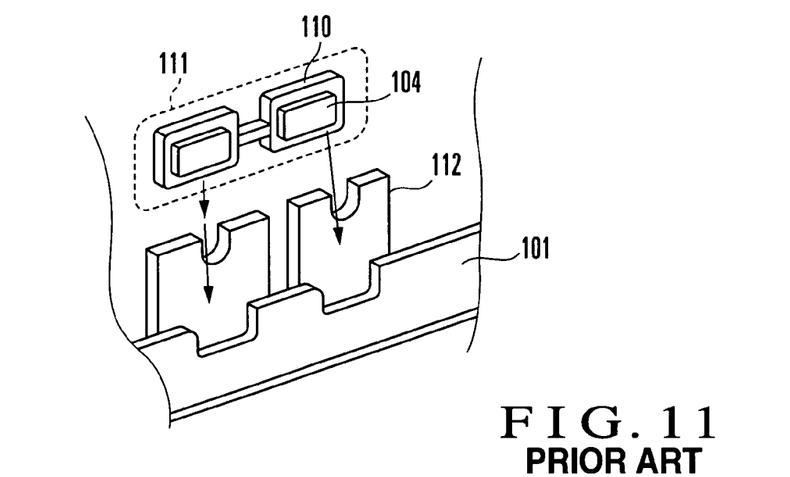
FIG. 11 is a view for explaining how a side surface operation button portion component 111 of the conventional portable telephone is attached to the inner surface of an upper case 101.

In the conventional portable telephone, when the operation button portion is to be attached to the housing, the front surface operation button portion component 102 and side surface operation button portion component 111 are separately attached to the inner surface of the upper case 101. In particular, as shown in FIG. 11, when attaching the side surface operation button portion component 111 to the inner surface of the upper case 101, it is fitted in a space defined by the inner wall of the upper case 101 and a side surface operation button component support wall 112 formed inside the upper case 101.

FIG. 10 schematically shows a section taken along the line A-A of the housing of the conventional portable telephone shown in FIG. 9. As shown in FIG. 10, the side surface operation button component support wall 112 as a part of the upper case 101 is located between the side surface operation buttons 104 and circuit board frame 108. Thus, light from the operation button illuminating light source 113 formed on the circuit board frame 108 is shielded by the side surface operation button component support wall 112 and does not reach the side surface operation buttons 104. Also, the side surface operation buttons 104 have no illuminating function. Usually, a plurality of operation button illuminating light sources 113 are arranged on the circuit board frame 108 to illuminate the plurality of front surface operation buttons 103. A necessary number of operation button illuminating light sources 113 are arranged at appropriate positions on the circuit board frame 108 so that a sufficiently large illumination quantity can be obtained on the plurality of front surface operation buttons 103 as a whole. In FIG. 10, only one illuminating light source is shown, and the remaining illuminating light sources are not illustrated.

In the embodiment of the present invention, as shown in FIG. 4, as the elastic sheet 6 is bent and arranged along the inner side surface of the upper case 1, the elastic sheet 6 comes into tight contact with the inner side surface of the upper case 1 by the restoration force of itself. Accordingly, the structure of the conventional portable telephone in which the side surface operation button portion component 111 including the side surface operation buttons 104 is supported by the side surface operation button component support wall 112 provided to the upper case 101 need not be employed. The side surface operation buttons 4 to be exposed to and arranged in the openings formed in the side surface of the upper case 1 are fixed to and supported at desired positions even if no side surface operation button component support wall 112 is provided.

In FIG. 1, the side surface operation button portion 10 of the operation button portion component 2 is bent at about 90° with respect to the front surface portion. The side surface operation button portion 10 is bent in this manner when the flat elastic sheet 6 is arranged inside the upper case 1.

As described above, in the portable telephone of the present invention and the method of manufacturing the same, since the front surface operation button portion and side surface operation button portion are integrally formed as one component, the side surface operation button portion component 111 (see FIG. 8) as in the conventional structure need not be additionally provided. The number of components necessary for forming the operation button portion is smaller by one than in the prior art. Thus, not only the number of steps of attaching the operation buttons but also the component cost can be decreased.

Conventionally, the side surface operation button component support wall 112 (see FIG. 10) is required to support the side surface operation button portion component 111 including the side surface operation buttons 104 and side surface operation button supports 110. In contrast to this, in the portable telephone of this embodiment and the method of manufacturing the same, as shown in FIG. 7, the elastic sheet 6 comes into tight contact with the inner side surface of the upper case 1 by the restoration force of itself. Thus, the side surface operation buttons 4 are fixed to and supported at the desired positions, and no side surface operation button component support wall 112 need be provided. As shown in FIG. 7, light from the operation button illuminating light source 13 formed on the circuit board frame 8 reaches the side surface operation buttons 4 through the elastic sheet 6 to illuminate the side surface operation buttons 4.

Usually, a plurality of operation button illuminating light sources 13 are formed on the circuit board frame 8 to illuminate the plurality of front surface operation buttons 3. A necessary number of operation button illuminating light sources 13 are arranged at appropriate positions on the circuit board frame 8 so that a sufficiently large illumination quantity can be obtained on the plurality of front surface operation buttons 3 as a whole. In FIG. 7, only one operation button illuminating light source 13 is shown, and the remaining illuminating light sources are omitted.

This embodiment shows a typical structure including the upper case 1 and lower case 5 as the entire structure of the housing case. The housing side surface is formed by combining the side surface portions of the upper case 1 and the side surface portion of the lower case 5.

Figure 5:
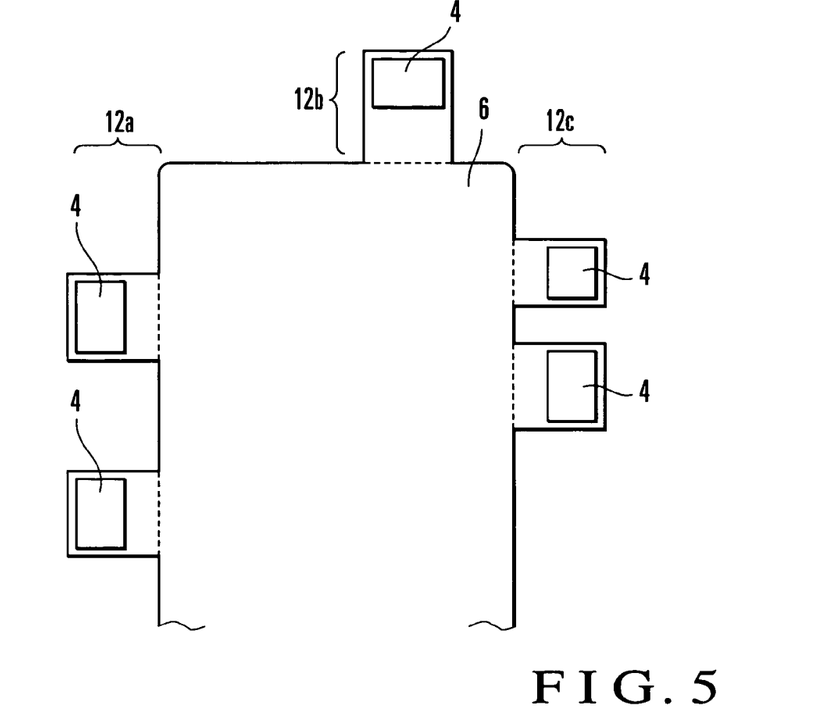
FIG. 5 is a view showing the first modification of the elastic sheet 6 in the portable telephone according to the embodiment shown in FIG. 1 of the present invention.

In this embodiment, the side surface operation buttons 4 are arranged on one side surface (with respect to the front surface) of the housing. The concept of the present invention can also be applied to a structure in which the side surface operation buttons 4 are arranged on a plurality of side surfaces of a housing. The upper side surface, right side surface, left side surface, lower side surface, and the like with respect to the front surface of the housing are arbitrarily selected and combined, and the side surface operation buttons 4 are arranged on the selected surfaces. For example, FIG. 5 shows an example in which side surface operation button portions (12a, 12b, and 12c) are formed on the three side surfaces with respect to the front surface of a housing (operation buttons 3 on the front surface portion are omitted; the broken line portions indicate bending lines). Projecting overhang portions from the elastic sheet 6 and side surface operation buttons 4 are formed as needed on side surface portions (12a, 12b, and 12c) that form one operation button portion component 2 on the basis of a predetermined design.

With the above structure, when the side surface operation buttons 4 are to be formed on the housing of the portable telephone, the number of components can be decreased by the number of side surfaces that are selected and combined, and accordingly the number of steps of attaching the operation button portion and the component cost can be decreased.

Figure 6:
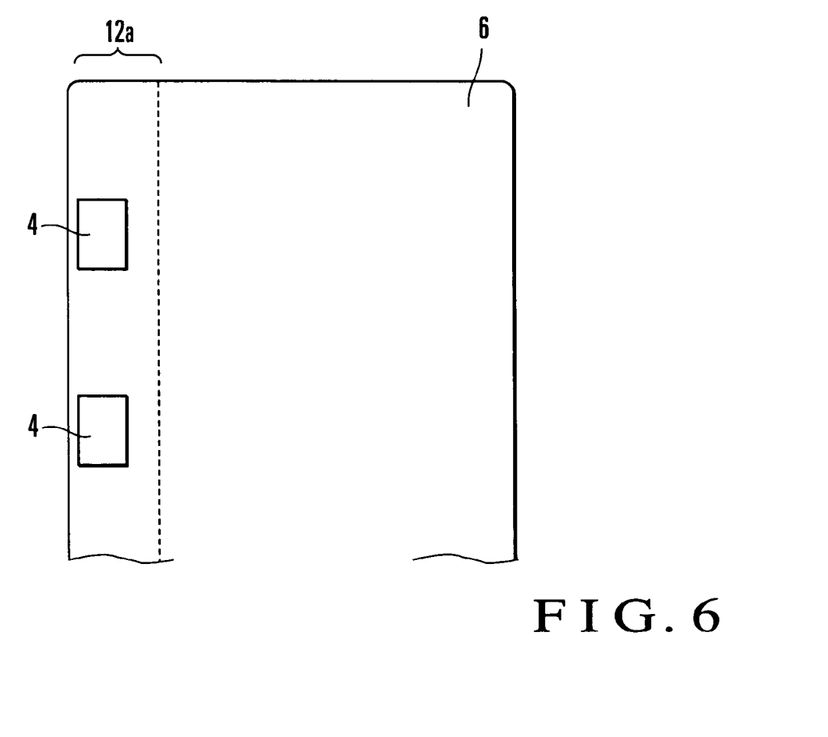
FIG. 6 is a view showing the second modification of the elastic sheet 6 in the portable telephone according to the embodiment shown in FIG. 1 of the present invention.

In this embodiment, as the side surface operation button portions 12, regions corresponding to the shape and number of the side surface operation buttons 4 are designed as shapes overhanging in a projecting manner from the front surface portion. However, the present invention is not limited to this. As shown in FIG. 6, regarding the shape of an operation button support portion in the side surface operation button portion 12 using the elastic sheet 6, the operation button portion component 2 may be designed and formed such that the side surface operation buttons 4 are arranged at predetermined positions on an extending region formed by extending the area of a simple elastic sheet such as a rectangular shape. In FIG. 6, the front surface operation buttons 3 at the front surface portion are not illustrated, and the broken line portion indicates a bending line.

According to this embodiment, the side surface operation buttons 4 are arranged to form an angle of about 90° with the front surface in the housing of the portable telephone. The angle formed by the side surface operation buttons 4 is not limited to this, but the side surface operation buttons 4 can be similarly arranged to form an angle of (90°±α) by allowing an increase/decrease of a predetermined angle α in accordance with the shape of the housing. For example, when the angle formed by the front surface and side surface in a housing is 60°, the side surface operation buttons 4 can be formed by bending the elastic sheet 6 along the side surface of the housing in accordance with the same structure and the same manufacturing procedure as in this embodiment.

The portable telephone of this embodiment has been described so far. The embodiment described above merely shows a preferred embodiment of the present invention. The present invention is not limited to this, and various changes and modifications can be made without departing from the spirit and scope of the present invention.

What is claimed is:

1. A portable telephone comprising:
   a housing case in which predetermined openings are formed at a plurality of portions to arrange a plurality of front surface operation buttons and plurality of side surface operation buttons of the portable telephone such that the openings are in one-to-one correspondence with said operation buttons;
   an operation button portion component which is arranged by bending along inner sides of front and side surfaces of said housing case and obtained by fixing said operation buttons on an elastic sheet with a predetermined design; and
   an operation button illuminating light source which is arranged on a circuit board frame to be incorporated in the portable telephone and illuminates the plurality of front surface operation buttons and side surface operation buttons.

2. A telephone according to claim 1, wherein said elastic sheet of said operation button portion component is light-transmitting.

3. A telephone according to claim 1, wherein said operation button illuminating light source comprises operation button illuminating light sources in number necessary to illuminate said plurality of front surface operation buttons and side surface operation buttons through the elastic sheet of said operation button portion component.

4. A telephone according to claim 1, wherein said operation button illuminating light source is arranged at a position on said circuit board frame which is necessary to illuminate said plurality of front surface operation buttons and side surface operation buttons through said elastic sheet of said operation button portion component.

5. A telephone according to claim 1, wherein said elastic sheet of said operation button portion component comprises an integrated sheet obtained by adding a regional portion to arrange said side surface operation buttons to a regional portion to arrange said plurality of front surface operation buttons.

6. A portable telephone manufacturing method comprising the steps of:
   forming, in a housing case of a portable telephone, predetermined openings at a plurality of portions to arrange a plurality of front surface operation buttons and plurality of side surface operation buttons such that the openings are in one-to-one correspondence with the operation buttons;
   arranging an operation button portion component, obtained by fixing the operation buttons on an elastic sheet with a predetermined design, by bending along inner sides of front and side surfaces of the housing case;
   arranging an operation button illuminating light source, which illuminates the plurality of front surface operation buttons and side surface operation buttons, on a circuit board frame to be incorporated in the portable telephone; and
   building the circuit board frame provided with the operation button illuminating light source into the housing case in which the operation button component is arranged.

* * * * *